United States Patent [19]

Kuijpers et al.

[11] 4,300,399

[45] Nov. 17, 1981

[54] MEASURING TWO-PHASE FLOW

[75] Inventors: Petrus J. M. Kuijpers; Paulus A. Stuivenwold; Johannes van Arkel, all of Rijswijk, Netherlands

[73] Assignee: Shell Oil Company, Houston, Tex.

[21] Appl. No.: 145,565

[22] Filed: May 1, 1980

[30] Foreign Application Priority Data

May 9, 1979 [GB] United Kingdom ............... 16130/79

[51] Int. Cl.$^3$ ............................. G01F 1/34; G01F 1/74
[52] U.S. Cl. ................................. 73/861.04; 73/861.69
[58] Field of Search ......................... 73/861.04, 861.69

[56] References Cited

U.S. PATENT DOCUMENTS 3,834,227  9/1974  Patterson ........................ 73/861.04
4,144,754  3/1979  Pitts, Jr. et al. ................... 73/861.69
4,183,243  1/1980  Patterson .
4,261,196  4/1981  Scheid, Jr. ........................ 73/861.04

FOREIGN PATENT DOCUMENTS 533871  10/1976  U.S.S.R. ........................... 73/861.69

Primary Examiner—Herbert Goldstein

[57] ABSTRACT

The individual flow rates of the phases of a flowing two-phase medium are determined by measuring the pressure differential between two locations in a pipe bend through which the flow passes.
The average value of the pressure differential and the RMS value of the pressure fluctuations are determined and compared with predetermined reference data.

8 Claims, 4 Drawing Figures

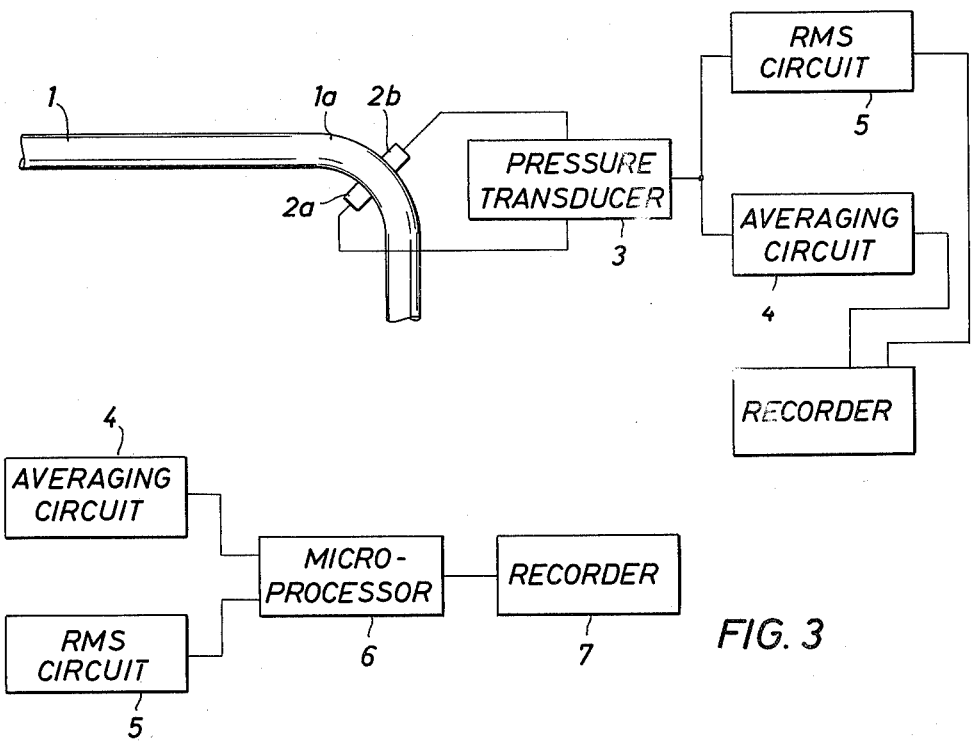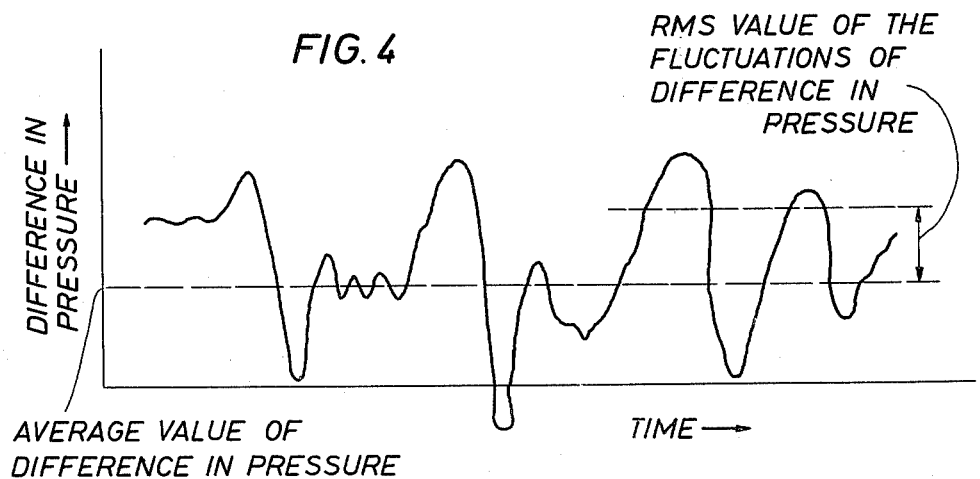

MEASURING TWO-PHASE FLOW

BACKGROUND OF THE INVENTION

The invention relates to a method and apparatus for determining by means of a single metering device the individual flow rates of the phases in a two-phase medium, said phases flowing simultaneously through a pipe or tube.

The method of the invention is based upon generating a centripetal force in said medium in a portion of the pipe and sensing said centripetal force as a difference in pressure between at least two locations of the pipe by means of a pressure transducer.

A second method for sensing said centripetal force is measuring the absolute pressure at each of two locations of the pipe by means of a pressure transducer and subsequently determining the difference between said absolute pressures.

Centripetal forces in a pipe may be generated by guiding the flow stream through a curved portion of the pipe, for example a 90° or 180° bend in the pipe. Another possibility of generation of such forces is by using a cyclone through which the medium is passed. Flow meters based upon measurement of centripetal forces are generally known; they are well-proven and give reliable results in case of single phase flow monitoring.

BRIEF SUMMARY OF THE INVENTION

The object of the invention is a technique for simultaneously measuring the individual flow rates of the phases in a two-phase medium.

The invention therefore relates to a method for determining the individual flow rates of the phases in a flowing two-phase medium, comprising the steps of creating a high pressure zone and a low pressure zone in the flowing medium by generating a centripetal force in the flow, determining a first quantity representative of the average centripetal force by measuring the average value of the difference in pressures at these zones over a predetermined time interval over which the flow conditions remain substantially constant, determining the second quantity representative of the average local turbulences and/or pulsations in the flow by determining the Root Mean Square value of the fluctuations of this difference over the same time interval, comparing the values of the first and second quantities with reference data of these quantities, which data represent individual flow rates of the two phases over time intervals over which the flow conditions have remained constant, and deriving from said comparison the individual flow rates of the two phases over said predetermined time interval. The "Root Mean Square" will be indicated in the specification and claims as "RMS".

The invention also relates to an apparatus for determining the individual flow rates of the phases in a two-phase medium, said phases flowing simultaneously through a pipe or tube including an element in which centripetal forces can be generated by the flow, said apparatus comprising a pressure transducer adapted for measuring a difference in pressure at two locations of said element and transmitting a signal representative of this difference in pressure, and means for determining the average value of this signal and the RMS value of the fluctuations of this signal, respectively.

By application of the technique according to the present invention individual flow rates of the two phases in a two-phase medium can be determined in a simple, reliable and economical manner.

The method and the apparatus according to the invention are in particular applicable to production operations in oil fields.

The method and apparatus according to the invention are very advantageous in particular for measuring the flow rates of a gas/liquid mixture in case of the two phases of the two-phase medium being gas and liquid. However, the present technique may also be used for determining the individual flow rates of the phases in a two-phase medium consisting of two non-mixable liquids.

BRIEF DESCRIPTION OF DRAWING

The present invention will be described by way of example in more detail with reference to the drawings, in which FIG. 1 shows a block diagram of an apparatus for determining individual flow rates of the two phases in a medium, flowing through a pipe or tube;

FIG. 3 shows a block diagram of an apparatus for recording and comparing the obtained data;

FIG. 4 shows a typical example of a transducer output signal of measurement of the difference in pressure over a time interval in a two-phase flow (in this example a gas-liquid slug flow under substantially atmospheric conditions).

PREFERRED EMBODIMENTS

Figure 2:
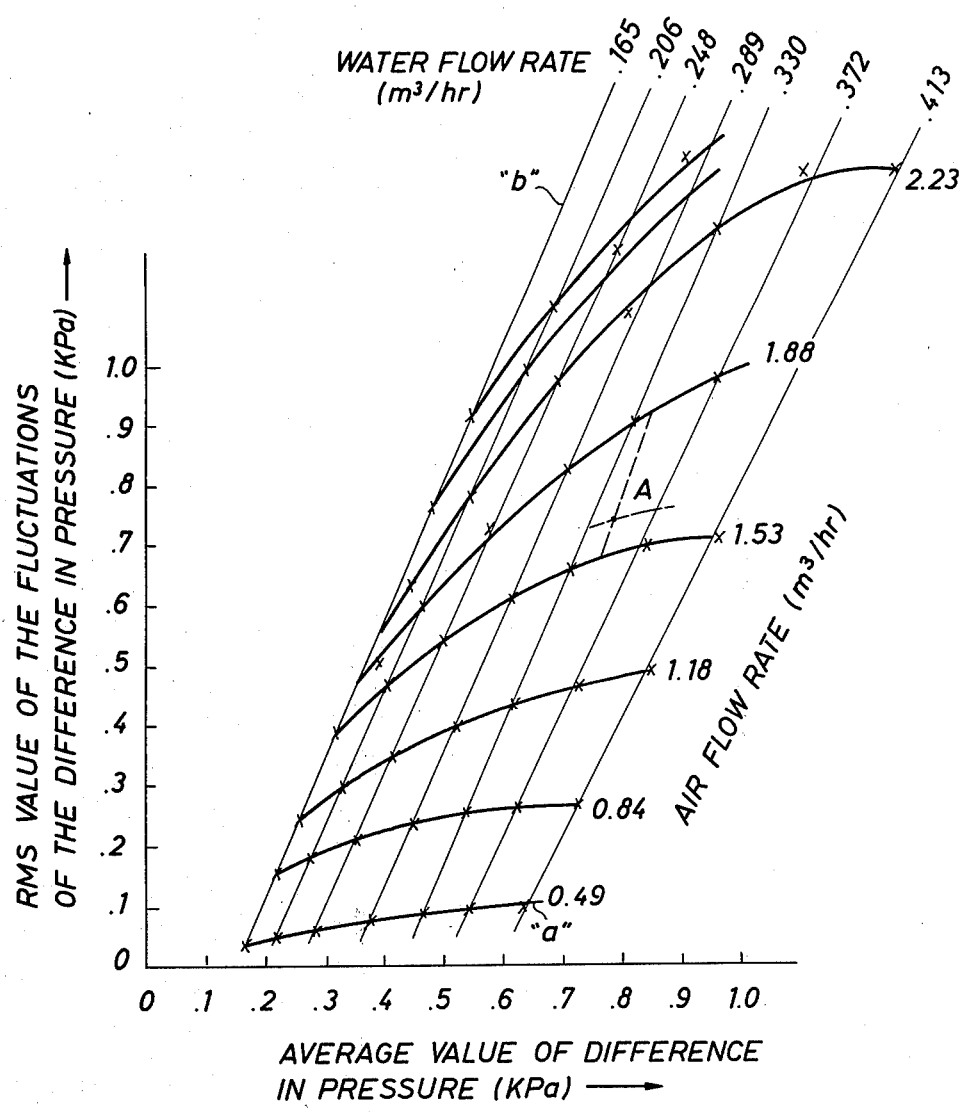
FIG. 2 shows an example of a record of reference data by means of a nomogram. Further, an example of determined values of the flow to be investigated is shown (measuring point A)

The invention is based upon the fact that the combination of the average value of the difference in pressure and the RMS value of the fluctuations of the said difference in pressure for each pair of flow rates of the two phases in the medium is unique. Using this fact, a set of data from which the individual flow rates of the two phases can be derived can be obtained by determining (measuring) and recording the reference data belonging to predetermined various known combinations of flow rates of the two-phase medium when being passed simultaneously through the pipe including the element in which a centripetal force is generated by the flow. This can be done in several ways; a very simple way is varying the flow rate of one of the phases while the flow rate of the other phase is kept constant, and measuring the reference data at each variation. After adjusting another constant flow rate, the measurements are repeated. Recording the reference data thus obtained may for example take place graphically.

Generating centripetal forces in the medium within the pipe may take place in various ways. For example, the element of the pipe, in which the centripetal forces can be generated in the flow, may be constituted by a pipe bend. Said pipe bend may have for example a 90° to 180° curvature.

Another way of generating centripetal forces in the medium within the pipe is by means of a cyclone.

In an advantageous embodiment of the apparatus of the invention a means for recording the obtained values may be present.

In another advantageous embodiment of the apparatus of the invention a means for comparing the determined values of the first and second quantities with reference data of these quantities is present, for example by means of a microprocessor or a computer.

Referring now to FIG. 1, a block diagram of an apparatus suitable for determining individual mass flow rates is shown.

A tube 1 having a tube element 1a, in which centripetal forces are generated (in this example a pipe bend having a 90° curvature) is shown, through which a two-phase flow is flowing. In this example the centripetal forces are generated in the medium by passing the stream through the curved portion of the pipe, formed by the pipe bend 1a and are sensed as a difference in pressure between two locations 2a and 2b of the bend 1a where such a difference in pressure, resulting from the centripetal forces, exists. This difference in pressure is measured by means of a pressure transducer 3. The measurements of the transducer 3 are supplied to an averaging circuit 4, which obtains the average value of the difference in pressure between the locations 2a and 2b. The measurements of the transducer 3 are further supplied to a RMS circuit 5, wherein the RMS value of the fluctuations of the difference in pressure is determined. The RMS value of said fluctuations is a measure of the average local turbulences and/or pulsations. The measurement takes place over a time interval in which the flow conditions are substantially constant.

Since the determined values of the difference in pressure arise from different physical phenomena, they respond to the individual phases in the two-phase medium in a different manner.

This will be made clear with reference to the nomogram of FIG. 2, wherein the reference data of the average value of difference in pressure and the RMS value of the fluctuations of the difference in pressure are being shown for various individual flow rates of the two phases of a two-phase flow consisting of air and water. The numbers at the end of the curves indicate the flow rates of the two phases in m$^3$/h.

Along the vertical axis the RMS values of the difference in pressure determined by the RMS circuit 5 are indicated in kPa, whereas the horizontal axis represents the average values of difference in pressure in kPa, determined by the averaging circuit 4. Further, a number of curves each representing a predetermined phase flow rate is shown.

The reference data are determined systematically by first flowing water through the pipe 1 of FIG. 1 at constant flow rates of stepwise increased values. This results in curve "a". Subsequently, at the smallest flow rate of curve "a", air is added to the flow in stepwise increasing quantities. This results in curve "b". The measurements are repeated at other constant flow rates of water and the values of the reference data thus obtained are recorded in the graph of FIG. 2 thereby yielding the curves shown. The flow rates of the phases are determined separately in a known way (for example by means of rotameters) before being added to flow through the pipe.

When only one phase is present in the flow the RMS value will be zero (or nearly zero) due to the absence of local turbulences and/or pulsations that represent the influence of the second phase.

An increasing flow of the second phase of the flowing medium produces local turbulences and/or pulsations which result in an increase of the RMS value of the difference in pressure. Of course, other ways for obtaining the reference data will be clear for any expert skilled in the art.

An example of a measurement to determine the individual flow rates of a two-phase flow of a mixture of air and water through the pipe 1 will now be given. At a particular flow condition, the values of the first and second quantities are determined in the manner as described with reference to FIG. 1. This first quantity represents the average value of the difference in pressure measured at locations 2a and 2b and equals 0.810 kPa for the particular flow condition. The second quantity represents the RMS value of the fluctuations of the said difference in pressure and equals 0.750 kPa. These values are subsequently plotted on the nomogram of the reference data shown in FIG. 2 (see measuring point A) and a water mass flow rate of 0.162 m$^3$/h and an air mass flow rate of 0.342 m$^3$/h is found by interpolation. The estimated relative accuracy is about 2 percent.

FIG. 3 shows a block diagram of an example of an apparatus for comparing the determined values of the first and second quantities with reference data of these quantities and recording the results. In this example no nomogram is used.

The values, obtained by the averaging circuit 4 and the RMS circuit 5 respectively, are supplied to a comparator, for example a microprocessor 6 and further supplied to a recording means 7.

FIG. 4 shows a typical example of a transducer output signal (in this example a water-air flow in a 1 cm internal diameter tube bend (slug flow, substantially atmospheric condition). From such signals the average value of the difference in pressure and the RMS value of the fluctuations of the difference in pressure are determined.

The technique of this invention can also be utilized for three and more phase flow by constructing nomograms from data obtained with known flows.

What is claimed is:

1. A method for determining the individual flow rates of the phases in a flowing two-phase medium, comprising the steps of:
   creating a high-pressure zone and a low-pressure zone in the flowing medium by generating a centripetal force in the flow;
   determining a first quantity representative for the average centripetal force by measuring the average value of the difference in pressures at these zones over a predetermined time interval over which the flow conditions remain substantially constant;
   determining a second quantity representative for the average local turbulences and/or pulsations in the flow by determining the RMS value of the fluctuations of this difference over the same time interval;
   comparing the values of the first and second quantities with reference data of these quantities, which data represent individual flow rates of the two phases over time intervals over which the flow conditions have remained constant; and
   deriving from said comparison the individual flow rates of the two phases over said predetermined time interval.

2. The method of claim 1, wherein the reference data are obtained by determining the said quantities in a flowing two-phase medium, in which the magnitudes of the individual flow rates are known, by varying the flow rate of one of the phases in the medium, and maintaining a constant flow rate of the other phase, measuring and recording the reference data at each variation and repeating such measurements at other constant flow rates of the other phase.

3. The method as claimed in claim 1 or 2, in which the two phases in the two-phase flow are gas and liquid.

4. An apparatus for determining the individual flow rates of the phases in a two-phase medium, said phases flowing simultaneously through a pipe, said apparatus comprising:
- a pipe section having a bend, said pipe section being coupled to said pipe;
- a pair of pressure measuring locations, said locations being disposed on the inside and outside of said bend, respectively;
- a difference measuring circuit, said pressure measuring locations being coupled to said difference measuring circuit;
- a RMS circuit, said difference measuring circuit being coupled to said RMS circuit;
- an averaging circuit, said difference circuit being coupled to said averaging circuit; and,
- comparing means, said RMS and averaging circuits being coupled to comparing means for comparing the value of the output of said RMS and averaging circuit with reference values.

5. The apparatus as claimed in claim 4, in which said means for comparing the determined values of the said quantities with reference data comprises a microprocessor.

6. The apparatus as claimed in claim 4, wherein the pipe bend has a 90° curvature.

7. The apparatus as claimed in claim 4, wherein the pipe bend has a 180° curvature.

8. The apparatus of claim 4 wherein said comparing means comprises a microprocessor.

* * * * *